US008547019B2

(12) United States Patent
Yao

(10) Patent No.: US 8,547,019 B2
(45) Date of Patent: Oct. 1, 2013

(54) LAMP ASSEMBLY AND CIRCUITS FOR PROTECTION AGAINST MISWIRING IN A LAMP CONTROLLER

(75) Inventor: Gang Yao, Mayfield Heights, OH (US)

(73) Assignee: General Electric Company, Schenectady, NY (US)

( * ) Notice: Subject to any disclaimer, the term of this patent is extended or adjusted under 35 U.S.C. 154(b) by 266 days.

(21) Appl. No.: 13/196,124

(22) Filed: Aug. 2, 2011

(65) Prior Publication Data

US 2013/0033181 A1 Feb. 7, 2013

(51) Int. Cl.
*H05B 37/00* (2006.01)

(52) U.S. Cl.
USPC .......................................................... 315/91

(58) Field of Classification Search
USPC .................. 315/91, 92, 200 R, 246, 307, 308, 315/DIG. 7; 361/54–57, 59–60, 77–82, 84, 361/88, 90
See application file for complete search history.

(56) References Cited

U.S. PATENT DOCUMENTS

| 5,604,411 | A | * | 2/1997 | Venkitasubrahmanian et al. ............................ 315/307 |
| 5,994,848 | A | * | 11/1999 | Janczak ......................... 315/224 |
| 6,373,200 | B1 | * | 4/2002 | Nerone et al. ................. 315/291 |
| 7,019,468 | B2 | | 3/2006 | Deurloo et al. |
| 2005/0156574 | A1 | * | 7/2005 | Sato et al. ..................... 320/134 |
| 2007/0001255 | A1 | | 1/2007 | Lin |
| 2008/0192396 | A1 | | 8/2008 | Zhou et al. |
| 2010/0244702 | A1 | | 9/2010 | Nerone |

OTHER PUBLICATIONS

Search Report and Written Opinion from corresponding PCT Application No. PCT/US2012/046438 dated Oct. 29, 2012.

* cited by examiner

*Primary Examiner* — Minh D A
(74) *Attorney, Agent, or Firm* — Peter T. DiMauro; Global Patent Operation

(57) ABSTRACT

An electronic circuit for use with a lamp controller includes a driver component and a voltage interface circuit powered by the driver component. The interface component delivers a low voltage power signal at a defined operating range via output lines to a downstream controller. A protection circuit is coupled with the voltage interface circuit. The protection circuit in one embodiment has an under-voltage switch disposed in one of the output lines and configured to open at a voltage less than the defined voltage range, and a blocking device disposed in the other output line and configured to block reverse power flow at a voltage above the defined voltage range. In another embodiment, the protection circuit has a first blocking device disposed in either one of the output lines to block reverse power flow to the voltage interface circuit, a PTC device disposed in either one of the output lines, and a second blocking device disposed across the output lines to protect the control circuit from a high voltage reverse polarity condition.

20 Claims, 3 Drawing Sheets

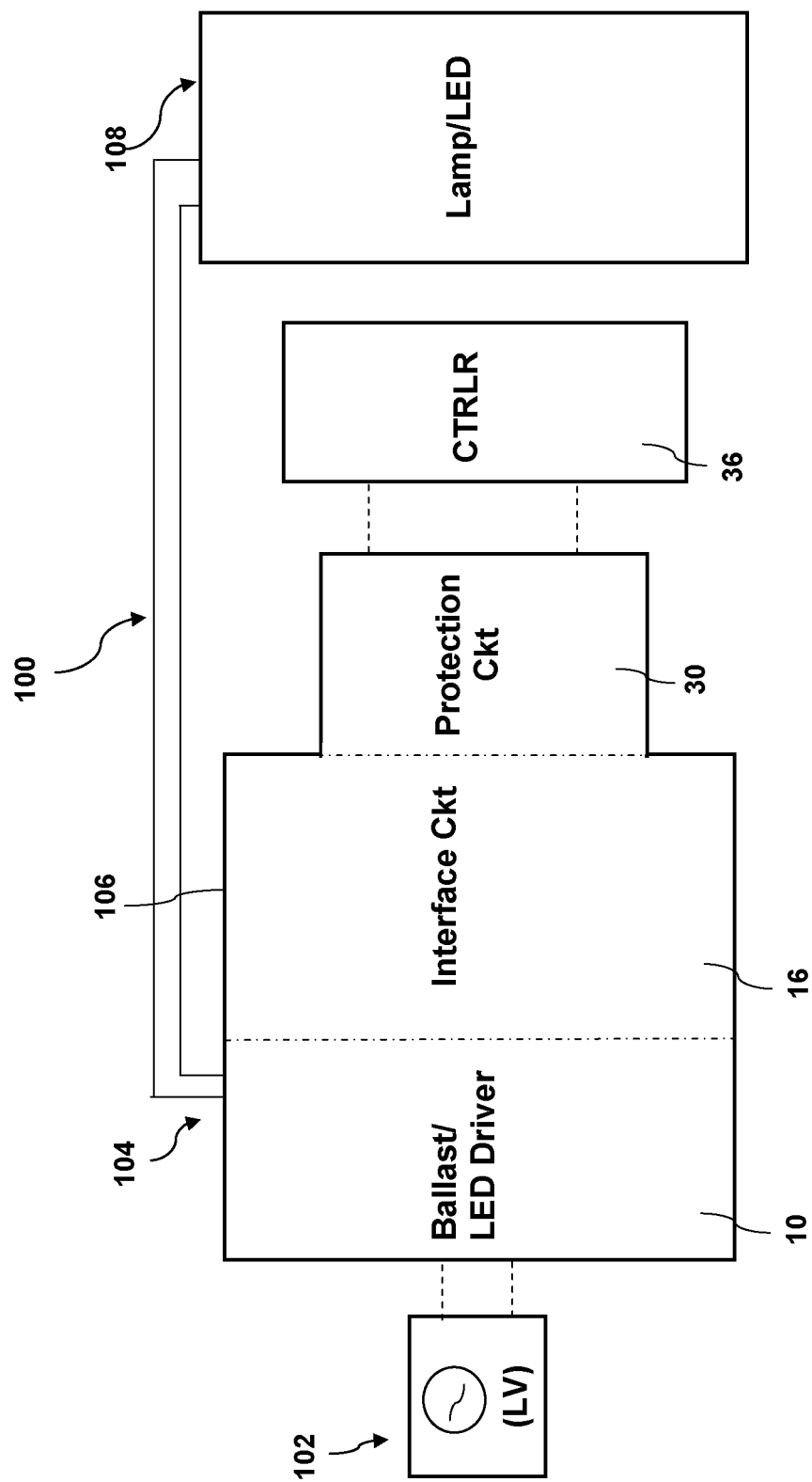
Fig. -1-

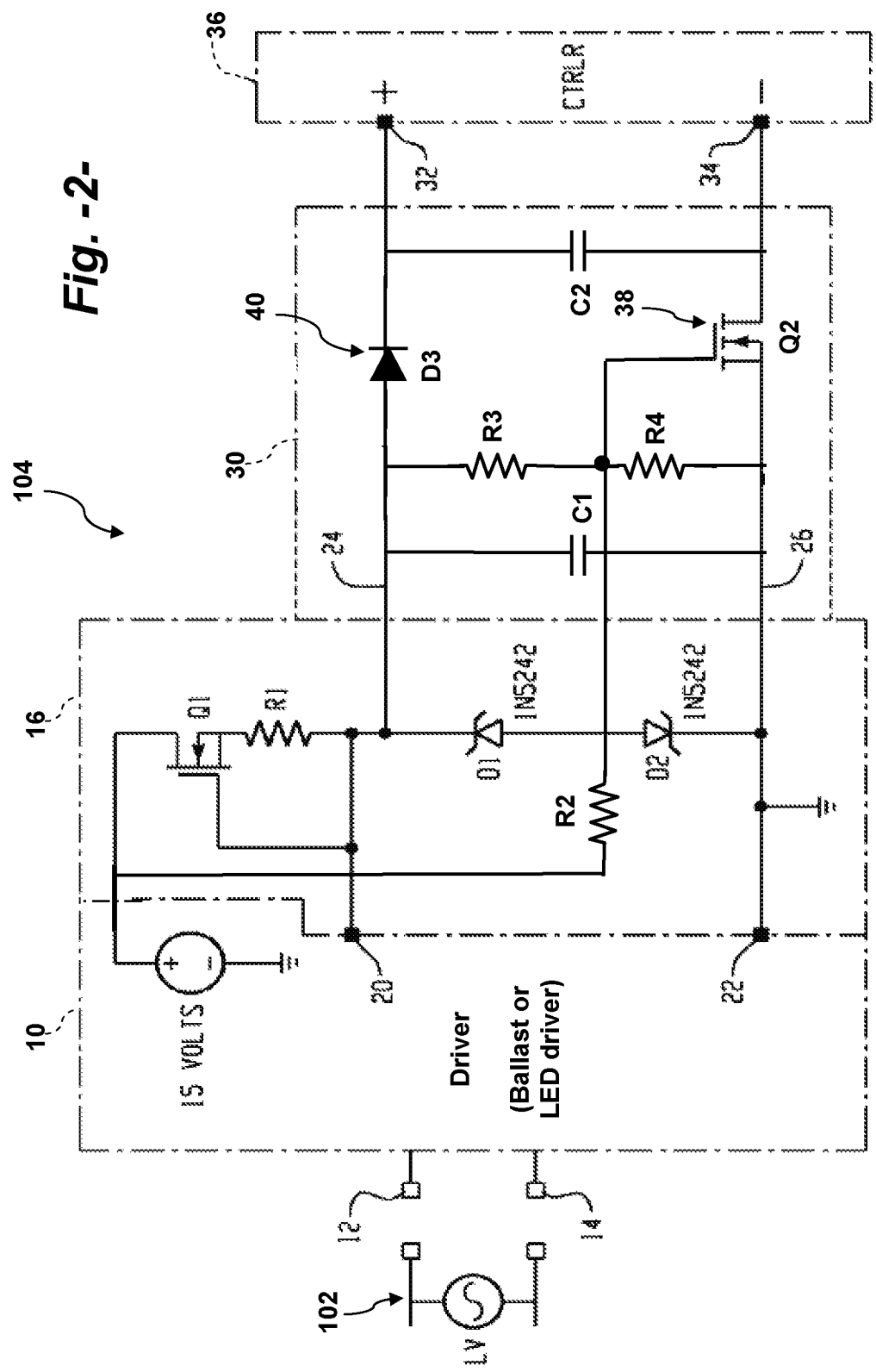
Fig. -2-

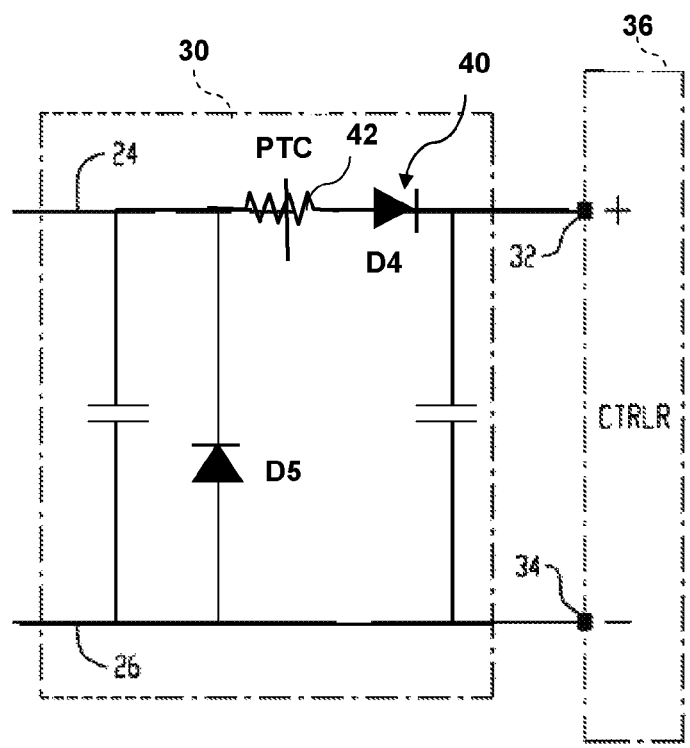
*Fig. -3-*
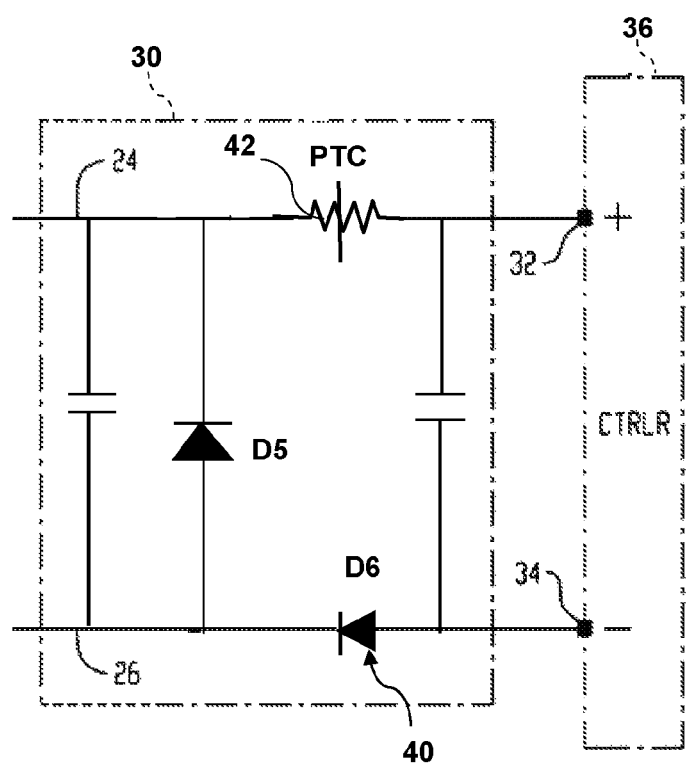
*Fig. -4-*

LAMP ASSEMBLY AND CIRCUITS FOR PROTECTION AGAINST MISWIRING IN A LAMP CONTROLLER

FIELD OF THE INVENTION

The field of the invention relates generally to electronic ballast or LED driver circuitry for use with the ignition of gas discharge lamps or LED general lighting, and more particularly to circuitry that protects the ballast circuitry or LED driver, particularly the dimming circuitry, from an overload condition.

BACKGROUND

Presently, it is common practice to house the ballast circuitry for gas discharge lamps in a common housing with a set of electrical leads extending from the housing for connection to a power line, such as a 120 volt/277 volt single phase AC line, and another set of electrical leads for outputting a low voltage/low amperage signal to the dimming controller. Despite appropriate color coding of each set of leads, miswiring of the leads continues to be a problem in the field wherein the low voltage signal leads intended for connection to the controller are mistakenly connected to a line voltage power source. This miswiring may lead to an over current condition and burn out of the electronic ballast circuitry.

Past attempts to protect the ballast interface circuitry and ballast against a damaging overvoltage condition have utilized a positive temperature coefficient (PTC) thermistor, which is a device that responds to the higher voltage by heating and increasing resistance thereby reducing the current flow in the interface circuit. The PTC is operable to return to its lower or cold resistance state when the overvoltage is removed thereby enabling resumption of the low voltage operation with the remote controller. A drawback, however, with conventional PTC configurations is that where the circuitry is encased in a potting compound, it is necessary to isolate the PTC from the potting compound to protect the potting compound from the elevated temperatures generated by the PTC in the event of miswiring. This has resulted in added cost due to the necessity of rearranging the circuitry to isolate the PTC.

U.S. Pat. Pub. No. 2010/0244702 describes a protection circuit that utilizes a depletion mode MOSFET switch in one or both of the positive and negative lines to the controller. These depletion mode MOSFET switches respond to overvoltage, including polarity reversal, to create an open circuit condition in the circuit to the controller. Depletion mode MOSFET devices are, however, relatively expensive and add to the overall cost of gas discharge lamp circuitry.

Thus, an alternate circuit for protecting the controller interface circuitry in an electronic ballast of a gas discharge lamp that is simple, effective, and relatively inexpensive would be desirable.

BRIEF DESCRIPTION OF THE INVENTION

Aspects and advantages of the invention will be set forth in part in the following description, or may be obvious from the description, or may be learned through practice of the invention.

Non-limiting aspects of the present subject matter relate to unique miswiring protection circuits for an electronic ballast or LED driver circuit in a gas discharge lamp or LED light, respectively. The protection circuits are relatively simple and effective, and do not have the disadvantages of the circuits based on conventional PTC thermistors or depletion mode MOSFETS discussed above.

In a particular embodiment, a control circuit for use with a lamp assembly is provided, for example a gas discharge lamp assembly or LED lamp assembly. The circuit includes a driver component, for example an electronic ballast if the lamp assembly is a gas discharge lamp, or an LED driver if the lamp assembly is an LED lamp. A voltage interface circuit is powered by the driver component and is configured to deliver a low voltage power signal within a defined operating range via output lines to a downstream controller. A protection circuit is coupled with the voltage interface circuit. The protection circuit includes an under-voltage switch disposed in one of the output lines and configured to open at a voltage less than the defined voltage range, and a blocking device disposed in the other of the output lines and configured to block reverse power flow to the voltage interface circuit at a setpoint voltage. With this circuit configuration, the control circuit is protected from reverse polarity by the under-voltage switch and from overvoltage by the blocking device.

In one embodiment, the under-voltage switch may be an N-channel MOSFET. The operating characteristics of this device may result in the device having a threshold voltage that is within the defined voltage range of the downstream controller (which may have a lower voltage value of zero (0) volts). Thus, to ensure complete operation of the controller within the defined operating voltage range, a biasing component may be configured with the N-channel MOSFET to maintain the device in an on-state within the full defined voltage range. The biasing component may be, for example, suitable biasing resistors that supply of bias voltage to the MOSFET switch.

In one embodiment, the blocking device may be a blocking diode, which may have a setpoint voltage that is less at the upper voltage value of the controller's defined operating voltage range. For example, the defined operating voltage range may be 0-10 volts, with the blocking diode having a setpoint voltage of 10 volts.

Embodiments of a control circuit for use with a gas discharge lamp assembly or LED lamp assembly are also encompassed wherein the protection circuit includes a first blocking device disposed in either one of the output lines to the controller and configured to block reverse power flow to the voltage interface circuit at setpoint voltage. A PTC device is disposed in either one of the output lines. A second blocking device is disposed across the output lines to protect the control circuit from a high, reverse polarity under-voltage condition.

The first and second blocking devices may be, for example, blocking diodes. A setpoint voltage of the first blocking diode may be set at the upper voltage of the defined operating voltage range of the controller.

Embodiments of the control circuit may include a downstream controller for the lamp assembly in a connected state with the voltage interface circuit. In other embodiments, the dimming circuit may be supplied separate from a downstream controller.

The present subject matter also encompasses any manner of lamp assembly that incorporates a protected dimming circuit in accordance with aspects of the invention.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 is a block diagram of a gas discharge lamp circuit;

FIG. 2 is a schematic diagram of an embodiment of a protected electronic ballast circuit;

FIG. 3 is a schematic diagram of an alternate embodiment of a protected electronic ballast circuit; and FIG. 4 is a schematic diagram of still another embodiment of a protected electronic ballast circuit.

DETAILED DESCRIPTION OF THE INVENTION

Reference now will be made in detail to embodiments of the invention, one or more examples of which are illustrated in the drawings. The same reference characters are assigned to the same components throughout the specification and drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 is a block diagram of the components of a lamp assembly 100 that may incorporate aspects of the present invention. The lamp assembly 100 may be, for example, a gas discharge lamp assembly or LED lamp assembly. The assembly 100 includes a circuit 104 that connects to a power source 102, such as any suitable line voltage (LV) source. The circuit 104 may be for dimming control purposes and converts the power from the source 102 to a certain current for a lamp 108, which receive the dimming control signal from a controller 36, as is understood in the art. The circuit 104 may be variously configured depending on the type of lamp assembly 100. For example, the circuit 104 may include a driver component 10, which may be an electronic ballast (for a gas discharge lamp) or an LED driver (for an LED lamp), an interface circuit 16, and a protection circuit 30, as described in greater detail below. The driver component 10, interface circuit 16, and protection circuit 30 may be configured in a common housing 106.

Referring to FIG. 2, an embodiment of a circuit 104 is shown in greater detail. The circuit 104 includes a driver component 10 configured for connection at terminals 12, 14 to opposite sides of the power source 102, indicated generally as any suitable line voltage (LV) source. As mentioned, the driver component 10 may be, for example, an electronic ballast or LED driver. The driver component circuitry 10 is connected to the interface circuit 16, which receives relatively low voltage D.C. power (e.g., 15 volts) from the electronic ballast component 10, which is converted to a relatively low current level (e.g., about 500 micro amps) by transistor Q1 (which may be of the MOSFET variety) and current limiting resistor R1 (which has a nominal value of about 5 kilo ohms). Zener diodes D1, D2, which may be 1N5242 devices, limit the voltage between lines 24 and 26 to about 12 Volts. The interface circuit 16 connects with the electronic ballast component circuitry 10 internally at junctions 20, 22.

The interface circuit 16 provides the relatively low current signal (e.g., about 500 micro-amps) along lines 24, 26 to the input of a protection circuit 30. The protection circuit 30 transfers the low current signal at output terminals 32, 34, which may be connected to the respective positive and negative terminals of a low voltage controller 36 (FIG. 1). The controller 36 has a defined operating voltage range, for example from 0 volts to 12 volts DC.

Typically, the controller 36 is of the type that provides a variable impedance or resistance in response to a sensed condition such as, for example, the movement of a control element by the user, or by the signal from a sensor such as a motion, photoelectric, infrared, Doppler, or other condition responsive sensor. The change in impedance of the controller provides a variable or bi-level voltage signal for changing the voltage of the interface circuit 16 for controlling dimming of the output of the electronic ballast 10 to the gas discharge lamps 110 (FIG. 1), as is well known in the art and need not be described in detail herein.

As mentioned, the circuit 104 may include the driver component 10, interface circuit 16, and protection circuit 30 incorporated into a common housing 106 that is provided with a pair of color coded leads extending to terminals 12, 14 for connection to power source 102 and with another pair of differently color coded leads extending from the housing 106 for connection to terminals 32, 34 of the controller 36. Despite these color coded precautions, the possibility exists that the circuit 104 can be miswired such that the output leads from the interface circuit 16 are inadvertently connected to the power source 102. The protection circuit 30 prevents damage to the circuit 104 in the event this happens.

Referring to FIG. 2, an embodiment of the protection circuit 30 is depicted. The circuit 30 includes split capacitors C1 and C2, and an under-voltage switch 38 disposed in one of the output lines 24, 26 from the interface circuit 16. This switch 38 is configured to open at a voltage less than the defined operating voltage range of the controller 36. For example, the defined operating voltage range of the controller 36 may be from 0 volts to 10 volts, wherein the under-voltage switch 38 is designed to open at a voltage less than 0 volts.

In a particularly useful embodiment, the under-voltage switch 38 may be an N-channel MOSFET (Q2), which is a relatively inexpensive and reliable device for use in a protection circuit 30 in accordance with aspects of the invention. These devices have a threshold voltage that, however, may lie within the defined operating voltage range of the controller 36. For example, the MOSFET (Q2) may have a threshold voltage of about 3 volts to about 4 volts, at which the device "turns-off" This would prevent the controller 36 from operating at the lower end of its design dimming range. It may thus be desired to incorporate a biasing component in the protection circuit 30 configured with the N-channel MOSFET (Q2) to maintain the MOSFET in an on-state within the full defined operating voltage range of the controller 36. For example, in the illustrated embodiment, voltage compensation is provided by the biasing resistors R2, R3, and R4, which serve to introduce a DC bias to the N-channel MOSFET to ensure that the device does not turn-off until voltage at the device falls below the lower defined operating voltage of the controller 36, which may be 0 volts.

When the voltage at terminal junction 34 falls below the cut-out voltage of the N-channel MOSFET (Q2), the MOSFET switches off and the circuit 104 is protected from a negative input (reverse polarity).

The protection circuit 30 also includes a blocking device 40 disposed in the other of the output lines 24, 26 to block reverse power flow to the voltage interface circuit 16 at a setpoint voltage, which may be the upper limit of the defined voltage operating range of the controller 36. The blocking device 40 thus protects the circuit 104 from an overvoltage condition. In the illustrated embodiment, the blocking device 40 is provided as a blocking diode D3 having a setpoint voltage at the upper value of the controller operating voltage range, for example 10 volts. When the voltage at terminal junction 32 exceeds 10 volts, the blocking diode D3 prevents power flow back to the interface circuit 16, which could be the result of an overvoltage condition caused by connecting the terminal junctions 32, 34 to the power supply (LV) 102.

It should be appreciated that, even at a high voltage condition at terminal junction 32, the N-channel MOSFET (Q2) is still in an on-state and the controller 36 will function at its full load mode. The blocking diode D3 only blocks reverse power to the interface circuit 16 above a setpoint value. This situation may result when the electronic ballast circuit 104 is properly connected in the gas discharge lamp assembly 100 (FIG. 1) but a downstream condition results in a temporary overvoltage state at the controller 36.

FIGS. 3 and 4 depict alternate embodiments of the protection circuit 30 that utilize a positive temperature coefficient (PTC) thermistor, which respond to higher voltage by heating and increasing resistance, thereby reducing current flow through the circuit 30. The protection circuit 30 also includes a blocking device disposed in either of the output lines 24, 26 to block reverse power flow to the voltage interface circuit 16 at a setpoint voltage, which may be the upper limit of the defined voltage operating range of the controller 36. The blocking device 40 thus protects the circuit 104 (FIG. 2) from an overvoltage condition. In the illustrated embodiment, the blocking device 40 is provided as a blocking diode D4 in FIG. 3 and blocking diode D6 in FIG. 4 having a setpoint voltage at the upper value of the controller operating voltage range, for example 10 volts. When the voltage at the terminal junctions 32, 34 exceeds 10 volts, the blocking diodes D4, D6 prevents power flow back to the interface circuit 16 (FIG. 2), which could be the result of an overvoltage condition caused by miswiring of the terminal junctions 32, 34 to the power supply (LV) 102 (FIG. 2).

Still referring to FIGS. 3 and 4, when voltage at the controller terminals 32, 34 is within the operating range (e.g., 0-10V), D4 (FIGS. 3) and D5 (FIG. 4) are in an "on" state, current through the PCT 42 is low, and the dimming controller 36 operates in its normal condition. When the input voltage at the controller 36 exceeds the operating range (e.g., >10V), D4 and D5 block power flow to the interference circuit 16 (FIG. 2).

In an under-voltage condition when the input voltage at the controller 36 goes below the operating range (e.g., <0V), D4 (FIG. 3), D6 (FIGS. 4) and D5 are "on" and the high voltage will be applied to the PTC 42, which will be heated and cause the PTC resistance to correspondingly increase. In this condition, because D5 is "on", the interference circuit 16 (FIG. 2) is protected from the high negative input (reverse polarity). Once the high input voltage is removed, the PTC resistance decreases to a normal level and the dimming controller 36 operates in a normal condition.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A control circuit for use with a lamp assembly, comprising:
   a driver component;
   a voltage interface circuit powered by said driver component and configured to deliver a voltage power signal within a defined operating voltage range via output lines to a downstream controller;
   a protection circuit coupled with said voltage interface circuit, said protection circuit comprising:
      an under-voltage switch disposed in one of said output lines and configured to open at a voltage less than the defined operating voltage range; and
      a blocking device disposed in the other of said output lines and configured to block reverse power flow to said voltage interface circuit at setpoint voltage;
   wherein said control circuit is protected from reverse polarity by said under-voltage switch and from overvoltage by said blocking device.

2. The control circuit of claim 1, wherein said driver component comprises an electronic ballast, said circuit configured for a gas discharge lamp assembly.

3. The control circuit of claim 1, wherein said driver component comprises an LED driver, said circuit configured for a LED lamp assembly.

4. The control circuit of claim 1, wherein said under-voltage switch comprises an N-channel MOSFET with a threshold voltage within the defined operating voltage range, and further comprising a biasing component configured with said N-channel MOSFET to maintain said N-channel MOSFET in an on-state within the full defined voltage range.

5. The control circuit of claim 4, wherein said biasing component comprises biasing resistors.

6. The control circuit of claim 5, wherein the defined operating voltage range has a lower voltage value of zero (0) volts, said biasing component maintaining said N-channel MOSFET in an on-state to zero (0) volts.

7. The control circuit of claim 1, wherein said blocking device comprises a blocking diode.

8. The control circuit of claim 7, wherein the setpoint voltage of said blocking diode is the upper voltage of said defined operating voltage range.

9. The control circuit of claim 1, further comprising a downstream controller connected to said voltage interface circuit.

10. A lamp assembly with controllable dimming, comprising:
    a driver component;
    a controller;
    a voltage interface circuit powered by said driver component and configured to deliver a low voltage power signal within a defined operating voltage range via output lines to said controller;
    a protection circuit configured with said voltage interface circuit, said protection circuit comprising:
       an under-voltage switch disposed in one of said output lines and configured to open at a voltage less than the defined operating voltage range; and
       a blocking device disposed in the other of said output lines and configured to block reverse power flow to said voltage interface circuit at a setpoint voltage;

wherein said control circuit is protected from reverse polarity by said under-voltage switch and from overvoltage by said blocking device.

11. The lamp assembly of claim 10, wherein said under-voltage switch comprises an N-channel MOSFET with a threshold voltage within the defined operating voltage range, and further comprising a biasing component configured with said N-channel MOSFET to maintain said N-channel MOSFET in an on-state within the full defined voltage range.

12. The lamp assembly of claim 11, wherein said biasing component comprises biasing resistors.

13. The lamp assembly of claim 12, wherein the defined operating voltage range has a lower voltage value of zero (0) volts, said biasing component maintaining said N-channel MOSFET in an on-state to zero (0) volts.

14. The lamp assembly of claim 10, wherein said blocking device comprises a blocking diode.

15. The lamp assembly of claim 14, wherein the setpoint voltage of said blocking diode is the upper voltage of said defined operating voltage range.

16. A control circuit for use with a lamp assembly, comprising:
   a driver component;
   a voltage interface circuit powered by said driver component and configured to deliver a low voltage power signal within a defined operating voltage range via output lines to a downstream controller;
   a protection circuit configured with said voltage interface circuit, said protection circuit comprising:
      a first blocking device disposed in either one of said output lines and configured to block reverse power flow to said voltage interface circuit at setpoint voltage;
      a positive temperature coefficient (PTC) device disposed in either one of said output lines; and
      a second blocking device disposed across said output lines to protect said control circuit from a reverse polarity high voltage condition.

17. The control circuit of claim 16, wherein said first and second blocking devices comprise blocking diodes.

18. The control circuit of claim 17, wherein the setpoint voltage of said first blocking diode is the upper voltage of said defined operating voltage range.

19. The control circuit of claim 16, further comprising a downstream controller connected to said voltage interface circuit.

20. A lamp assembly with controllable dimming, comprising:
   a driver component;
   a controller;
   a voltage interface circuit powered by said driver component and configured to deliver a low voltage power signal within a defined operating voltage range via output lines to said controller;
   a protection circuit configured with said voltage interface circuit, said protection circuit comprising:
      a first blocking device disposed in either one of said output lines and configured to block reverse power flow to said voltage interface circuit at setpoint voltage;
      a PTC device disposed in either one of said output lines; and
      a second blocking device disposed across said output lines to protect said control circuit from a reverse polarity high under-voltage condition.

* * * * *